H. D. & F. A. BOKOP.
HARROW.
APPLICATION FILED NOV. 20, 1913.
1,128,285.
Patented Feb. 16, 1915.
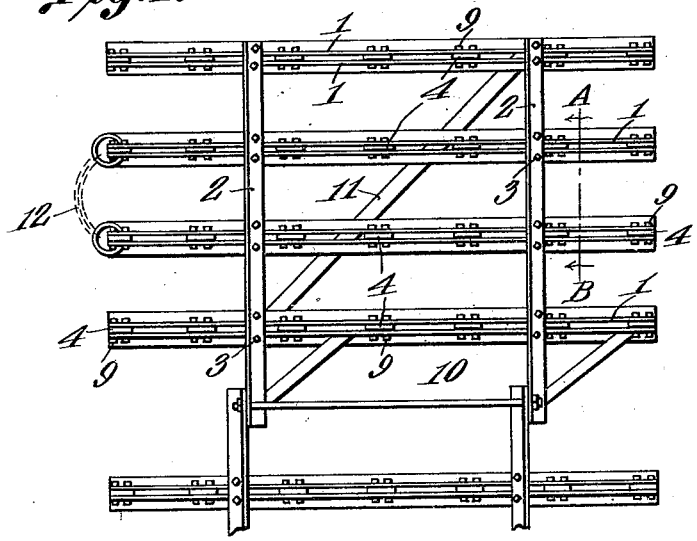
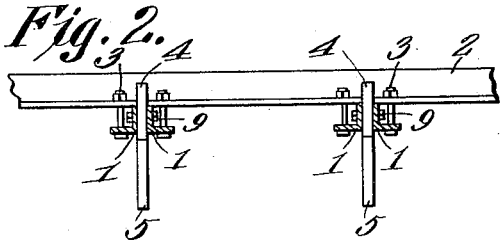
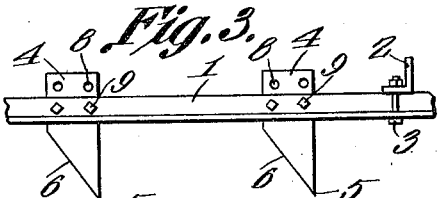
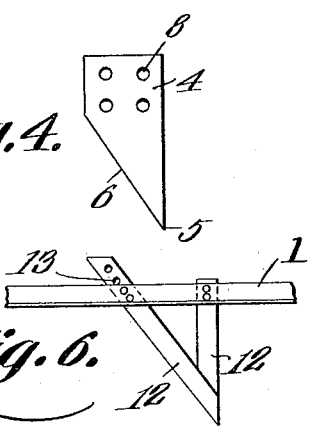
Henry D. Bokop and
Frederick A. Bokop,
Inventors
Witnesses
by C. A. Snow & Co.
Attorneys

UNITED STATES PATENT OFFICE.

HENRY D. BOKOP AND FREDERICK A. BOKOP, OF DEFIANCE, OHIO.

HARROW.

1,128,285. Specification of Letters Patent. Patented Feb. 16, 1915.

Application filed November 20, 1913. Serial No. 802,133.

*To all whom it may concern:*

Be it known that we, HENRY D. BOKOP and FREDERICK A. BOKOP, citizens of the United States, residing at Defiance, in the county of Defiance, State of Ohio, have invented a new and useful Harrow, of which the following is a specification.

This invention relates to drags, harrows, cultivators and like agricultural implements, one of its objects being to provide an all metal structure of this character having teeth of novel form combined therewith, the teeth being so shaped as to be easily and cheaply constructed, readily fastened fixedly to the bars of the implement and capable of either cutting into the soil over which they are drawn or of smoothing the soil, this being dependent upon the direction in which the implement is drawn.

A further object is to provide teeth which are practically self-sharpening.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of a portion of a harrow, one complete section and a portion of another section being shown. Fig. 2 is an enlarged section on line A—B Fig. 1. Fig. 3 is an enlarged side elevation of a portion of one of the longitudinal members of the harrow. Fig. 4 is a detail view of one of the teeth. Fig. 5 is a view showing how two teeth can be made from a single blank in one operation. Fig. 6 is a detail view showing a modified form of tooth.

Referring to the figures by characters of reference 1 designates angle strips arranged in pairs the strips of each pair being oppositely disposed with their bases extending laterally. Mounted on the upwardly extending portions of the strips 1 are cross strips 2 which are also angular in cross sectional contour, the same being held to the strips 1 by bolts 3 extending downwardly through the bases of the strips 1, as shown particularly in Fig. 2. Extending between the strips 1 of each pair are harrow teeth of peculiar form. The teeth are preferably made by cutting from metal plates or bars and each includes an upper end or head 4 having a point 5 formed by cutting diagonally, as shown at 6, through oblong strips or bars 7. Apertures 8 are formed in pairs in the head 4 of each tooth and bolts 9 which extend transversely through the longitudinal strips 1, are adapted to extend through either pair of apertures in each tooth.

The cross strips 2 extend beyond one side of the harrow section and are adapted to be hingedly connected to the corresponding strips of the next adjoining harrow section by means of a longitudinal rod 10 extending through the lapping ends of said cross strips, as shown in Fig. 1. Thus a flexible harrow is obtained, it being understood that any desired number of sections may be assembled to make a harrow of any desired proportions. The longitudinal strips, which in the preferred form of construction consist of angle strips in pairs, are so arranged that a broad surface is presented in a horizontal plane permitting the use of cross bracing 11, which may consist of one continuous piece extending the entire width of the harrow section and may be secured to the longitudinal strips by welding, brazing, riveting, bolting, or any other suitable means.

It is to be understood that all of the teeth of the harrow are to be similarly mounted. The harrow is adapted to be drawn by means of a draft chain 12 connected to one side portion of the front of the harrow so that the sections of the harrow will be drawn while disposed diagonally across the path of movement. Thus the harrow teeth, instead of pulling straight along the soil, will be disposed diagonally. Should the vertical edges of the teeth be in advance during the movement of the harrow, the points 5 of the teeth will cut into the soil so as thus to loosen it. Should the diagonal edges 6 of the teeth be in front, which position can be obtained by reversing the harrow, the teeth will operate to smooth the soil rather than to cut into it. By utilizing the diagonal edges 6, the teeth become practically self-shapening. Should the teeth become unduly worn, they can be adjusted downwardly by removing bolts 9 and inserting them in the upper aperture 8. It will be seen that by arranging the teeth between parallel strips 1 as shown, they will be held rigidly and a durable and compact structure is thus obtained. Importance is also attached to the particular means of producing the teeth, it being apparent that by thus forming them from oblong strips or bars of metal, such as shown in Fig. 5, two teeth can be simultaneously produced from each oblong strip, simply by producing a diagonal cut across the strip and punching the apertures 8 into the end portions of the strip.

Instead of forming the teeth as hereinbefore described, they can be made as illustrated in Fig. 6. By referring to this figure it will be seen that each tooth is made up of two pieces 12 meeting at or adjacent their lower ends forming one or more obliquely disposed active edges. The pieces 12 can be secured together at their meeting portions or can be left separate. Furthermore the plates or pieces 12 can be provided with apertures 13 for the reception of suitable fastening means or they can be secured to the tooth beams of the harrow by welding or in any other suitable manner. The same is likewise true of the teeth shown in Figs. 3 and 4. By providing the series of apertures 13 in the plates 12, it is possible to make as many adjustments for wear as may be desired.

What is claimed is:—

1. In an agricultural implement, the combination with longitudinal angle strips arranged in pairs and having oppositely extending flanges, of continuous cross strips bearing upon the longitudinal strips, means for fixedly connecting the cross strips to the longitudinal strips, and diagonal braces extending under and secured to the longitudinal strips.

2. In an agricultural implement, the combination with parallel longitudinally extending angle strips arranged in pairs and having oppositely extending flanges, of continuous cross strips bearing upon the longitudinal strips, means for fixedly connecting the cross strips to the longitudinal strips, braces extending under and secured to the longitudinal strips, teeth between the longitudinal strips of each pair, and means for binding said strips upon opposed faces of the teeth.

In testimony that we claim the foregoing as our own, we have hereto affixed our signatures in the presence of two witnesses.

HENRY D. BOKOP.
FREDERICK A. BOKOP.

Witnesses:
ART OSBORN,
J. E. WOLSIFFER.